(12) United States Patent
Thomas et al.

(10) Patent No.: US 7,696,435 B1
(45) Date of Patent: Apr. 13, 2010

(54) ELECTRICAL CONDUIT WITH INTERNAL LINING

(76) Inventors: Geral D. Thomas, 5920 Blue Label St., North Las Vegas, NV (US) 89081-6671; Vincent A. Cimorelli, 2300 E. Silverado Ranch Blvd., Apt. 1085, Las Vegas, NV (US) 89123-3969

( * ) Notice: Subject to any disclaimer, the term of this patent is extended or adjusted under 35 U.S.C. 154(b) by 0 days.

(21) Appl. No.: 12/189,733

(22) Filed: Aug. 11, 2008

Related U.S. Application Data

(60) Provisional application No. 60/954,997, filed on Aug. 9, 2007.

(51) Int. Cl.
*H02G 3/04* (2006.01)
(52) U.S. Cl. .................. 174/68.3; 174/68.1; 174/72 A; 174/481; 174/650; 138/118; 439/451
(58) Field of Classification Search ............... 174/68.1, 174/68.3, 72 A, 481, 650, 24, 64; 138/103, 138/104, 118, 131; 439/451
See application file for complete search history.

(56) References Cited

U.S. PATENT DOCUMENTS

| | | | | |
|---|---|---|---|---|
| 3,835,241 | A * | 9/1974 | Masterson et al. | 174/87 |
| 4,306,819 | A * | 12/1981 | Schusseler | 401/198 |
| 5,259,418 | A * | 11/1993 | Hamrick | 138/104 |
| 7,057,104 | B1 * | 6/2006 | McCleskey | 174/505 |

* cited by examiner

*Primary Examiner*—Dhiru R Patel
(74) *Attorney, Agent, or Firm*—Kenehan & Lambertsen, Ltd.; John C. Lambertsen

(57) ABSTRACT

A rigid conduit has a hard plastic exterior surface and electrical metallic tubing as the interior surface. The hard plastic exterior forms a smooth male fitting at one end of the conduit and a smooth female fitting at the other end of the conduit. Chemical solvent adhesives join together adjacent conduit sections, the hard plastic male and female fittings fusing together. The interior surface of electrical metallic tubing protects the exterior hard plastic material from damage caused during cabling of the electrical raceways. The exterior hard plastic protects the rigid conduit from corrosive environments, such as underground installations.

7 Claims, 2 Drawing Sheets

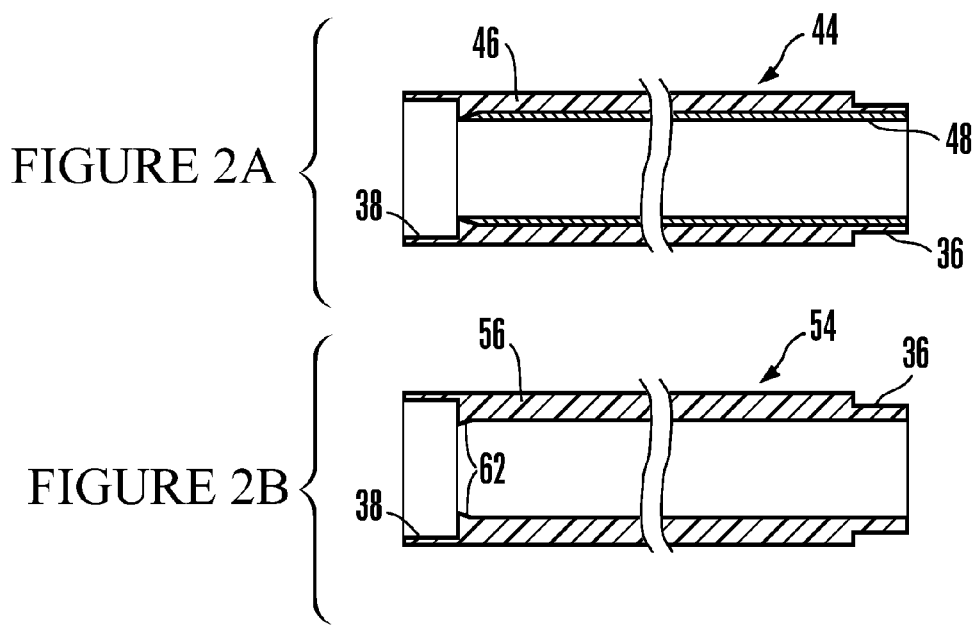
FIGURE 2A
FIGURE 2B
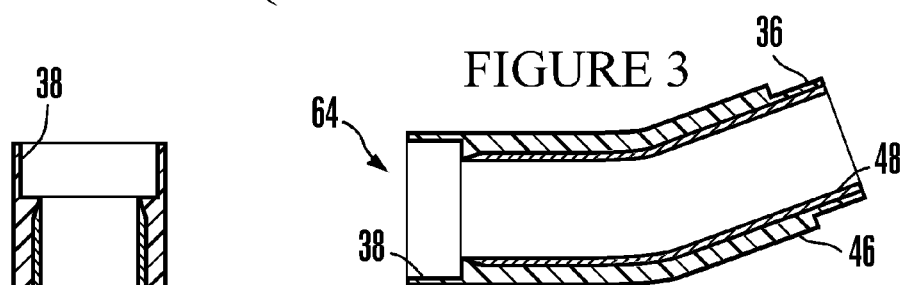
FIGURE 3
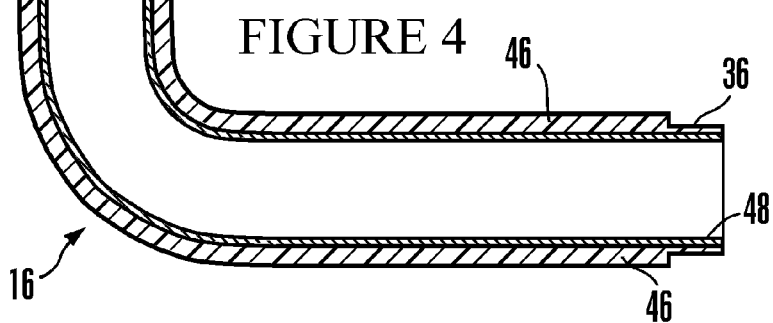
FIGURE 4
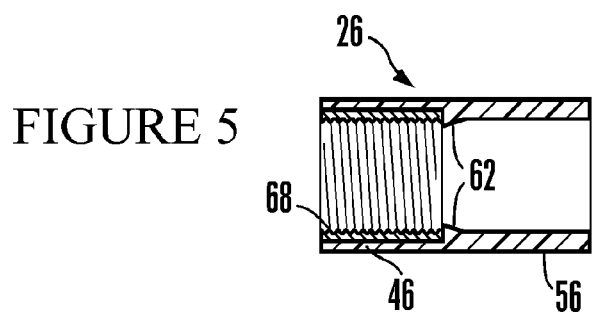
FIGURE 5

ELECTRICAL CONDUIT WITH INTERNAL LINING

RELATED APPLICATIONS

The present application claims priority under 35 U.S.C. §119(e) to U.S. Provisional Patent Application Ser. No. 60/954,997, filed Aug. 9, 2007, which is incorporated by reference herein.

BACKGROUND OF THE INVENTION

1. Field of the Invention

The present invention relates to electrical conduits and raceways and, more particularly, to such conduits and raceways as are resistant to physical damage. More specifically, the present invention relates to electrical conduits and raceways having a metal lining and an outer layer of PVC or like plastics.

2. Description of the Related Art

Underground installations of electrical raceways, conduit or duct banks for current carrying conductors are designed to be waterproof and corrosion proof. The majority are now fabricated out of PVC (Polyvinylchloride), and used to construct direct burial raceways that can run horizontal or vertical. When a change of course is required, bends are used to go left or right for horizontal runs and bends permit a change in direction of up and down for vertical runs.

Electricians are bound by the National Electrical Code to insure the safety and quality of electrical installations, with the Code offered for use in law and for regulatory purposes in the interest of life and property protection. As provided in ARTICLE 300.5 (4) ENCLOSURE OR RACEWAY DAMAGE, where the enclosure or raceway is susceptible to being physically damaged, the conductors shall be installed in one of the following: rigid metal conduit; intermediate conduit; Schedule 80 rigid nonmetallic conduit; or an equivalent.

Another set of requirements is present where it is anticipated that pull string will be used to pull rope through the raceway for wire pulls. In such environments, the materials used to fabricate the conduit must prevent the string or rope from cutting or burning through the interior radius of the bends. Openings resulting from such internal radius failure will expose the current conductors to water and corrosive elements outside of the raceway, as well as adversely impact the pulling process.

Overhead or exposed raceways are not subjected to the harsh environment of underground installations, permitting the use of Electrical Metallic Tubing (EMT), which has thinner walls than the rigid conduit used to construct all bends used in underground applications. Of course, the EMT walls in above-ground installations also must be sufficiently thick to permit wire pulls without encountering inner radius failure. Structurally suitable for such above ground applications, EMT is more cost effective than its underground counterpart: the thicker-walled, Galvanized Steel Rigid bends.

DISCLOSURE OF THE INVENTION

In accordance with aspects of embodiments of the present invention, the advantages of this newly developed product with all PVC bends lined with EMT (Electrical Metallic Tubing) would include the following: (1) It will not allow the interior radius of the bends to be cut or burned though when pulling; (2) It will be cheaper priced per unit; (3) It will be less labor intensive to install; (4) It will not require female PVC adapters; (5) It will not require corrosion resistance 10 mil tape; (6) It will be much lighter in weight than its rigid counterpart thus reducing the injury rate of the installers; and (7) It will have a larger glue surface than the female adapter counterparts used with threaded rigid bends, which will make it stronger, more stable, and provide a better seal, securing the conductors within the conduit from attack by outside elements.

To the journeyman electrician, these features translate into less labor required during installation, with considerable time saved by gluing the male to female PVC slip coupling on one end and gluing the female to the male slip coupling on the other end of the bend.

Another aspect of the present invention provides a rigid conduit adapted for installation of an electrical conductor therethrough, said conduit comprising: a rigid tubing having an interior surface and an exterior surface, said exterior surface comprising a hard plastic and said interior surface comprising an electrical metallic tubing.

In a further aspect of the present invention an adapter conduit of configuration suitable for connecting an electrical raceway of rigid metal conduit and a conduit having an exterior surface of a hard plastic, said adapter conduit comprising: a rigid tubing having a first end comprising a solid plastic tube with an exterior surface and an interior surface, said interior surface defining a smooth female fitting, and a second end comprising a rigid tubing having an exterior surface comprising a hard plastic and an interior surface comprising a threaded metal inlay, said threaded metal inlay extending inwardly from said second end to a terminal edge located within said rigid tubing.

BRIEF DESCRIPTION OF THE DRAWINGS

The foregoing aspects and other aspects of this disclosure are described in detail below in connection with the accompanying drawing figures in which:

FIG. 2A is a partial side elevation view in cross-section of a conduit member taken along the lines 2-2 of FIG. 1;

FIG. 2B is a partial side elevation view, in cross-section, similar to FIG. 2A, of an alternative conduit member taken along the lines 2-2 of FIG. 1;

FIG. 3 is a side elevation view, in cross-section, of a curved conduit member of FIG. 1 taken along the lines 3-3;

FIG. 4 is a side elevation view, in cross-section, of a 90-degree curved conduit member of FIG. 1 taken along the lines 4-4; and FIG. 5 is a side elevation view, in cross-section, of an adapter conduit member of FIG. 1 taken along the lines 5-5.

DETAILED DESCRIPTION OF THE PREFERRED EMBODIMENTS

Figure 1:
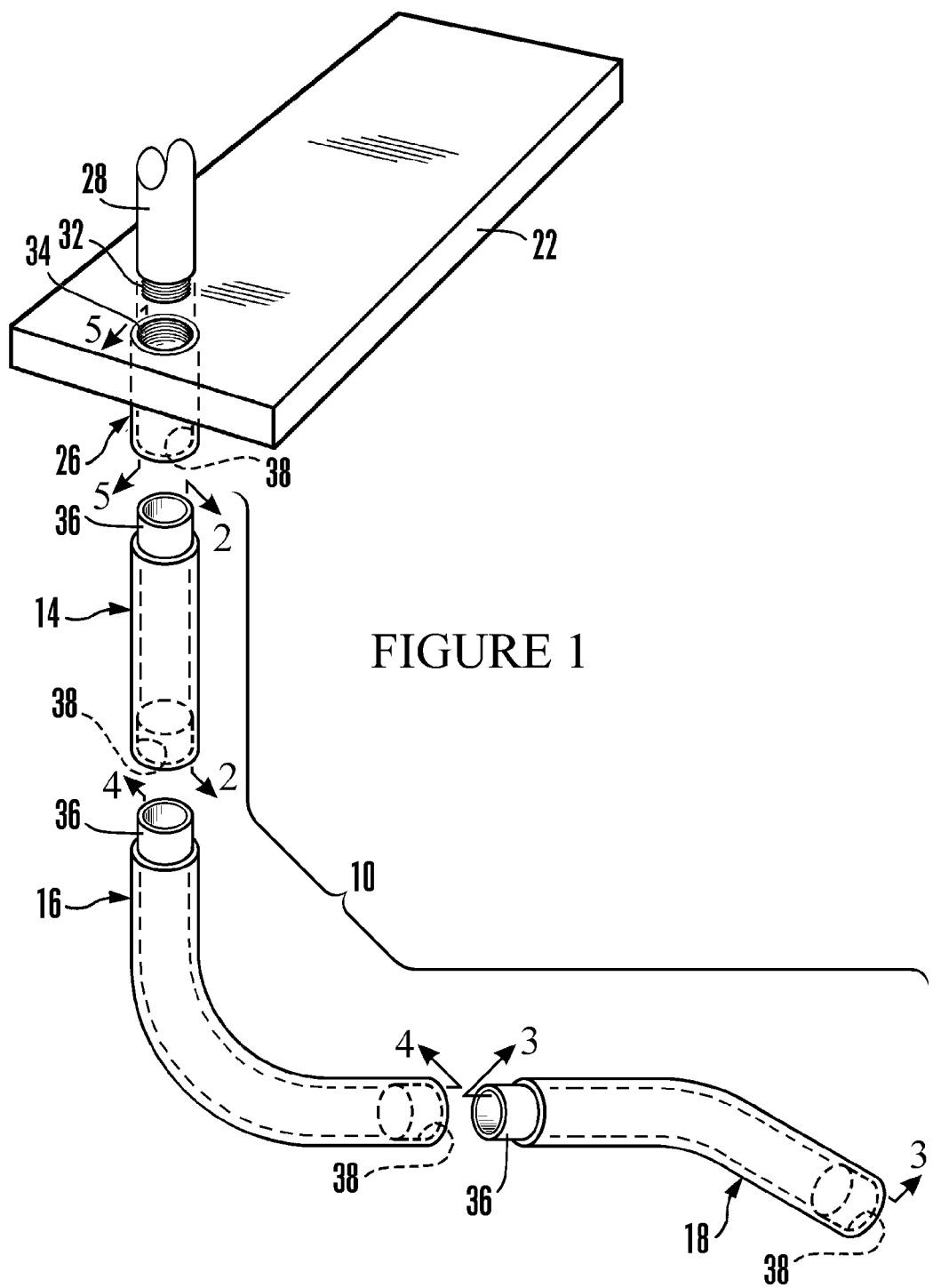
FIG. 1 is an exploded schematic view, with portions shown in phantom, of a direct burial raceway or conduit construction in accordance with the present invention.

Reference is now made to the drawings wherein like numerals refer to like parts throughout. In FIG. 1 an underground raceway 10 is schematically depicted, consisting of a plurality of individual raceway conduit members—the number and nature of individual conduit members dependent upon the specifications and requirements called out for a specific project or job. The underground raceway 10 of FIG. 1 includes a straight conduit 14, vertically arranged, a ninety-degree (90°) elbow 16, and a thirty-degree (30°) elbow 18. It is presently contemplated that these conduits of lesser bend might range from ten degrees (10°) to forty-five degrees (45°)—although degrees outside of this range are also considered within the scope of the present invention.

The underground raceway 10 is shown terminating in a concrete slab 22, such as a housekeeping slab for the placement of electrical equipment (not shown in the drawings). An adapter conduit 26 is provided to connect the underground raceway 10 to an exposed raceway 28 located above ground. The exposed raceway 28 terminates in a threaded metal male fitting 32. The adapter conduit 26 is provided a threaded metal female fitting 34 of appropriate dimension to permit the formation of a threaded metal connection between the adapter conduit 26 and the exposed raceway 28.

As is shown in FIG. 1, each of the raceway conduit members is provided a smooth male fitting 36 and a smooth female fitting 38. In FIG. 1 the smooth male fitting 36 of the straight conduit 14 is received by the smooth female fitting 38 of the adapter conduit 26 to complete the connection between the underground raceway 10 and the exposed raceway 28.

It is presently contemplated to fabricate an outer surface of the raceway conduit members from PVC (polyvinyl chloride) or a similar hard plastic material. In addition to providing structural rigidity to the raceway conduit members, the use of PVC as the outer surface permits formation of mechanically secure and air/water-tight connections between adjacent conduits. In a known manner, the application (during field assembly) of chemical cements to both mating surfaces causes a fusing together of those surfaces, forming permanent connections between adjacent conduits that are virtually impervious to leakage.

As noted previously, some raceway assemblies require wire pulls for placement of the electrical wiring within the raceways. Curved sections of conduit risk damage from inner radius frictional wear during these wire pulls, requiring a material resistant to "burn-throughs"—typically a metal. Additionally, when installation is underground, corrosion concerns frequently result in the specification of Galvanized rigid conduit (GRC), which is heavy, expensive, and requires the on-site formation of threaded connections to adjacent conduit, a tedious process.

In FIG. 2A a multi-layer straight conduit 44 utilizes a hard plastic outer layer 46, such as PVC, and an inner metal tubing 48, such as electrical metallic tubing (EMT). The metal used to form the tubing can be ferrous or non-ferrous; the latter, for example, aluminum, is often specified for reasons of weight or for spark/ignition sensitive areas. The hard plastic outer layer 46 provides corrosion resistance, is lighter in weight than the metal it replaces, and permits the installer to form secure and leak-proof connections in the same manner as with PVC conduits.

Such connections are obtained using the conduit of FIG. 2A, where the multi-layer straight conduit 44 terminates at one end in a smooth male fitting 36 and at the other in a smooth female fitting 38. Use of the PVC-style connections can, in some circumstances, enable construction of the underground raceway 10 (see FIG. 1) in whole or in large part outside of the trench. Complete or substantially complete segments can then be lowered into place, greatly simplifying raceway construction.

"Burn-through" is not considered an issue for straight conduits, and in FIG. 2B a plastic conduit 54 is provided with substantially identical outer dimensions to the multi-layer straight conduit 44 of FIG. 2A, lacking only the inner metal tubing 48, utilizing instead a solid plastic tube 56. The plastic conduit 54 terminates in the smooth male fitting 36 and the smooth female fitting 38 that are formed in the solid plastic tube 56 in a similar manner to that of the multi-layer straight conduit 44 discussed above.

Internally, a taper 62 is preferably formed, slightly narrowing of the inner diameter of the solid plastic tube immediately adjacent the female fitting 38. The taper minimizes the opportunity for wire snags at the connection between two conduits when wire is being fed through the connected tube raceway.

Of course not all raceway conduit can be straight, and in FIG. 3 a curved conduit 64 is provided, also having the hard plastic outer layer 46 and the inner metal tubing 48. As previously mentioned, the inner metal tubing 48 is particularly advantageous in protecting the hard plastic outer layer 46 from burn-through during wire pulls. The degree of bend can vary, with pre-fabricated bends of 45°, 30°, 22½°, and 15° presently contemplated. Also contemplated for both straight and curved conduits, diameters ranging from ½-inch to 6 inches—although larger and smaller diameters are considered to fall within the scope of the present invention.

The 90° elbow 16 of FIG. 4 provides a significant change in raceway direction, enhancing the risk of burn-through. Note that in both the curved conduit 64 and the 90° elbow 16, the inner metal tubing 48 minimizes the need for the taper 62 found beneficial when using the solid plastic tube 56 of FIG. 2B.

It is presently contemplated that the raceways described herein may be utilized in both underground and above ground installations, with the connections formed as discussed above. However, in the instances and at those locations where connections are required between the raceways of the present invention and rigid conduit, the adapter conduit 26 (best shown in FIG. 5) is provided.

Somewhat resembling a spliced-together creation, the adapter conduit 26 provides a portion having the solid plastic tube 56 with a smooth female fitting 38 formed therein. A second portion has the hard plastic outer layer 46 receiving a threaded metal inlay 68, which provides a threaded metal female fitting 34 suitable for connection to a rigid conduit such as Galvanized Rigid Conduit. Additionally, as was the case with the plastic conduit 54 of FIG. 2b, the solid plastic tube 56 of the adapter conduit 26 is provided with the taper 62 to minimize the opportunities for wire snags.

Our invention has been disclosed in terms of a preferred embodiment thereof, which provides an electrical conduit with internal lining that is of great novelty and utility. Various changes, modifications, and alterations in the teachings of the present invention may be contemplated by those skilled in the art without departing from the intended spirit and scope thereof. It is intended that the present invention encompass such changes and modifications.

We claim:

1. A first rigid conduit member suitable for constructing an electrical raceway adapted for installation of an electrical conductor therethrough, said conduit member comprising:

a rigid tubing having an interior surface and an exterior surface, said exterior surface comprising a hard plastic and said interior surface comprising unthreaded ferrous or nonferrous thinwall of circular cross section, wherein at a first end of said rigid tubing, said hard plastic forms an interior surface of a configuration defining a smooth female fitting, wherein at a second end of said rigid tubing an exterior surface of said hard plastic is configured in a manner defining a smooth male fitting, and wherein said first end of said rigid tubing is adapted to be received by and joined to a second conduit member having a smooth male fitting of hard plastic and said second end of said rigid tubing is adapted to be received by and joined to a third conduit member having a smooth female fitting of hard plastic.

2. The rigid conduit according to claim 1 wherein said unthreaded ferrous or nonferrous thinwall extends within said rigid tubing to a location that is spaced from said first end.

3. The rigid conduit according to claim 2 wherein said unthreaded ferrous or nonferrous thinwall extends to a location within said rigid conduit abutting said smooth female fitting.

4. The rigid conduit according to claim 1 wherein said unthreaded ferrous or nonferrous thinwall underlies the smooth male fitting configuration of said hard plastic.

5. The rigid conduit according to claim 4 wherein said unthreaded ferrous or nonferrous thinwall inwardly extends from said second end of said rigid tubing in a substantially continuous manner and underlies said smooth male fitting configuration of said hard plastic.

6. The rigid conduit according to claim 1 wherein said hard plastic is polyvinyl chloride.

7. An adapter conduit of configuration suitable for connecting an electrical raceway of rigid metal conduit and a conduit having an exterior surface of a hard plastic, said adapter conduit comprising:

a rigid tubing having a first end comprising a solid plastic tube with an exterior surface and an interior surface, said interior surface defining a smooth female fitting, and a second end comprising a rigid tubing having an exterior surface comprising a hard plastic and an interior surface comprising a threaded metal inlay, said threaded metal inlay extending inwardly from said second end to a terminal edge located within said rigid tubing, wherein said interior surface defining a smooth female fitting extends from said first end of said adapter conduit to a location adjacent said terminal edge of said threaded metal inlay and wherein said interior surface defining a smooth female fitting forms an inwardly tapered surface immediately adjacent said terminal edge of said threaded metal inlay.

* * * * *